United States Patent
Fu et al.

(10) Patent No.: US 8,806,236 B2
(45) Date of Patent: Aug. 12, 2014

(54) POWER MATCHING SYSTEM

(75) Inventors: Ying-Bin Fu, Shenzhen (CN); Ting Ge, Shenzhen (CN); Ya-Jun Pan, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 373 days.

(21) Appl. No.: 13/316,491

(22) Filed: Dec. 10, 2011

(65) Prior Publication Data

US 2013/0043853 A1 Feb. 21, 2013

(30) Foreign Application Priority Data

Aug. 17, 2011 (CN) .......................... 2011 1 0236066

(51) Int. Cl.
*G06F 1/26* (2006.01)

(52) U.S. Cl.
USPC ............................ 713/300; 713/320; 713/322

(58) Field of Classification Search
CPC ......... G06F 1/26; G06F 1/324; G06F 1/3206; H02M 3/156; H02M 3/157; H02M 3/158; H02M 3/325; H02M 3/33507; H02M 3/33515; H02M 2001/0041

See application file for complete search history.

(56) References Cited

U.S. PATENT DOCUMENTS

| | | | |
|---|---|---|---|
| 2009/0276639 A1* | 11/2009 | Saha et al. ..................... | 713/300 |
| 2009/0327776 A1* | 12/2009 | Nguyen ........................ | 713/320 |
| 2010/0149838 A1* | 6/2010 | Artusi et al. .................... | 363/20 |

* cited by examiner

*Primary Examiner* — Dennis M Butler
(74) *Attorney, Agent, or Firm* — Novak Druce Connolly Bove + Quigg LLP

(57) ABSTRACT

A power matching system is applied to a central processing unit (CPU) power supply, which includes a power control chip to regulate the frequency of the signal applied to the CPU power supply. The power control chip includes a detecting pin. The power matching system includes a control unit and a control circuit. The control unit includes a platform controller hub (PCH) to obtain information concerning a CPU, a basic input output system (BIOS) to obtain a power rating of the CPU, and an integrated baseboard management controller (IBMC) to output a required signal to the control circuit according to the power rating established. The power control chip receives the required signal from the control circuit and regulates the frequency of the signal applied to the CPU power supply.

5 Claims, 2 Drawing Sheets

POWER MATCHING SYSTEM

BACKGROUND

1. Technical Field

The present disclosure relates to a power matching system.

2. Description of Related Art

In many computer systems, a power supply can be designed to support different central processing units (CPUs), which have varying power ratings. In the case of switched-mode power supplies, the frequency of the signal applied to a DC-DC converter providing power to the CPU needs to be regulated for supporting different CPUs. However, in traditional designing, the maximum frequency of the signal to converter is selected as the default to support different CPUs, this wastes power when a CPU having a low power rating is used. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean at least one.

Figure 1:
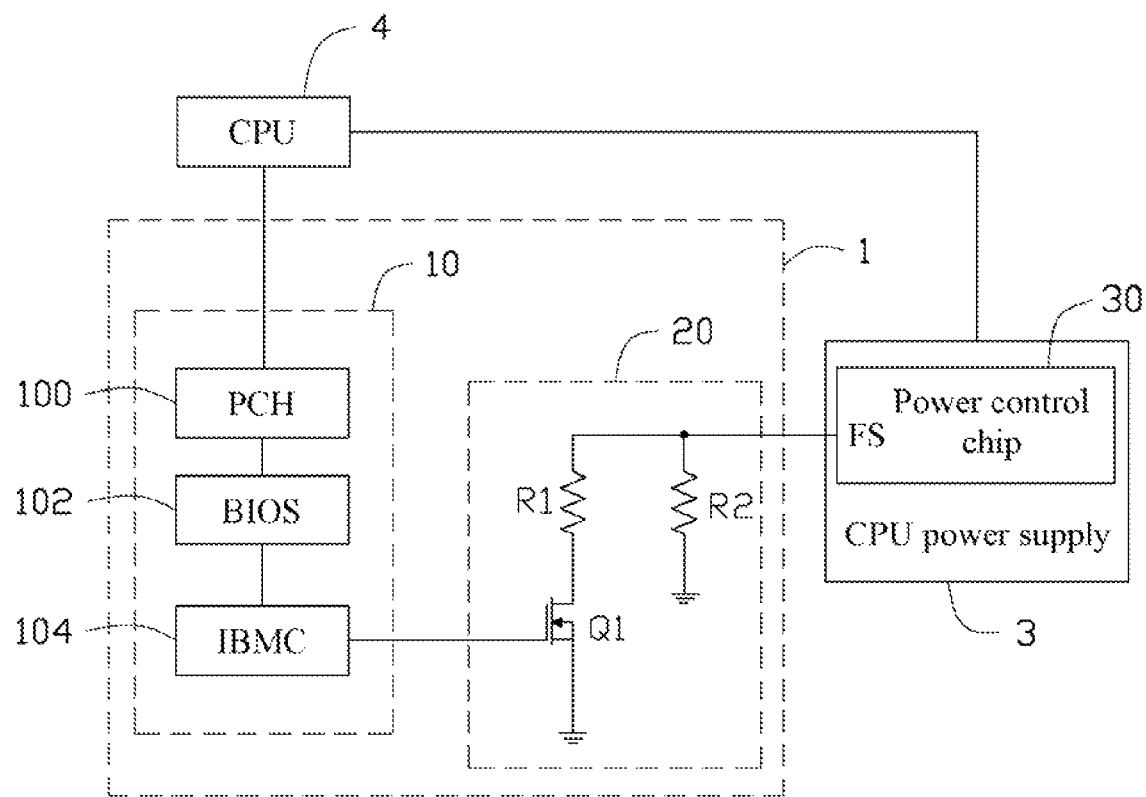
FIG. 1 is a circuit diagram of a power matching system in accordance with a first exemplary embodiment of the present disclosure.

Referring to FIG. 1, a power matching system 1 is applied to a central processing unit (CPU) power supply 3, which includes a power control chip 30. The power control chip 30 is used for regulating the frequency of the signal applied to the CPU power supply 3. The power matching system 1 in accordance with a first exemplary embodiment includes a control unit 10 and a control circuit 20. The control unit 10 obtains the power rating of a CPU 4 and outputs a control signal to the control circuit 20 according to the power rating. The control circuit 20 receives the control signal and outputs a required signal to the power control chip 30. The power control chip 30 receives the required signal from the control circuit 20 and regulates the frequency of the signal applied to the CPU power supply 3.

The control unit 10 includes a platform controller hub (PCH) 100, a basic input output system (BIOS) 102 connected to the PCH 100, and an integrated baseboard management controller (IBMC) 104 connected to the BIOS 102 and also connected to the control circuit 20. The PCH 100 can obtain information concerning the CPU 4 and store the information. The BIOS 102 reads the information from the PCH 100 and gains the power rating of the CPU 4, and outputs this data to the IBMC 104. The IBMC 104 receives the data and outputs the appropriate control signal to the control circuit 20.

The control circuit 20 includes an electronic switch, such as a n-channel field effect transistor (FET) Q1, and resistors R1 and R2. In other embodiments, the FET Q1 may be a npn transistor. A gate of the FET Q1 is connected to the IBMC 104, to receive the control signal from the IBMC 104. A source of the FET Q1 is grounded. A drain of the FET Q1 is connected to a detecting pin FS of the power control chip 30 through the resistor R1, to output the required signal. The resistor R2 is connected between the detecting pin FS of the power control chip 30 and ground.

The power control chip 30 includes the detecting pin FS connected to the control circuit 20, to receive the required signal from the control circuit 20 and regulate the frequency of the signal applied to the CPU power supply 3. The type of the power control chip 30 may be ISL6364. In one embodiment, the power control chip 30 includes a constant current source, which outputs a current to the drain of the FET Q1 through the detecting pin FS and the resistor R1, when the gate of the FET Q1 receives a signal at a certain level, to turn on or turn off the FET Q1. At the same time, the control chip 30 can obtain different resistances through the detecting pin FS corresponding to the FET Q1 being turned on or off. The control chip 30 can regulate the frequency of the signal applied to the CPU power supply 3 according to the received different resistances.

In one embodiment, the CPU power 3 can support two different CPUs, which have different power ratings. In use, when the power rating of the CPU 4 is 95 W, the frequency of the signal applied to the CPU power 3 should be regulated to 400 KHz. Now, the IBMC 104 outputs a high level signal to the FET Q1. The FET Q1 is turned on. The power control chip 30 obtains the resistance of the resistors R1 and R2 connected in parallel through the detecting pin FS and regulates the frequency of the signal applied to the CPU power supply 3 to 400 KHz according to the resistance. When the power rating of the CPU 4 is 65 W, the frequency of the signal applied to the CPU power supply 3 should be regulated to 300 KHz. Now, the IBMC 104 outputs a low level signal to the FET Q1. The FET Q1 is turned off. The power control chip 30 gains the resistance of the resistor R2 through the detecting pin FS and regulates the frequency of the signal to the CPU power supply 3 to 300 KHz according to the resistance.

Figure 2:
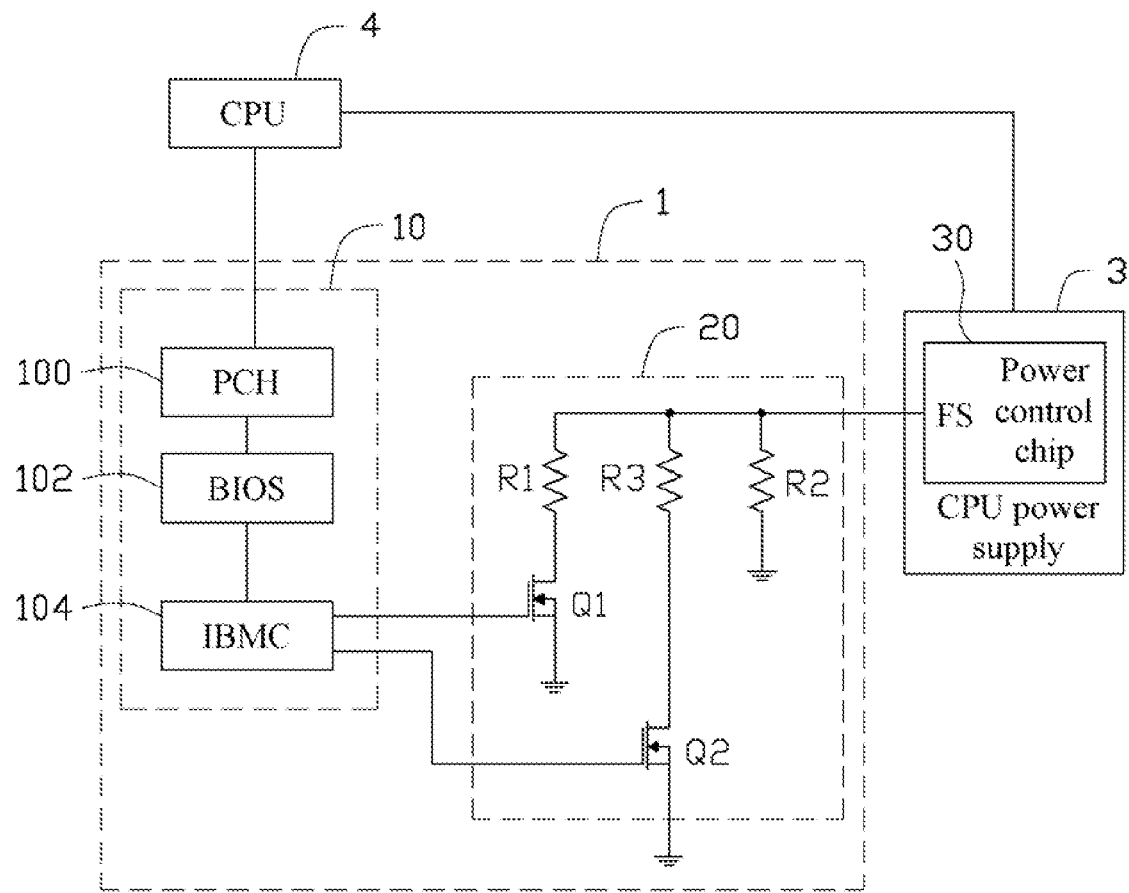
FIG. 2 is a circuit diagram of a power matching system in accordance with a second exemplary embodiment of the present disclosure.

Referring to FIG. 2, in the second exemplary embodiment, the control circuit 20 includes a FET Q2 and a resistor R3 in place of the resistor R1 and the FET Q1 of the first exemplary embodiment. In other embodiments, the FET Q2 may be a npn transistor. A gate of the FET Q2 is connected to the IBMC 104, to receive a control signal from the IBMC 104. A source of the FET Q2 is grounded. A drain of the FET Q2 is connected to the detecting pin FS of the power control chip 30 through the resistor R3. In the second embodiment, the CPU power supply 3 can support three different CPU power ratings. In use, when the power rating of the CPU 4 is 130 W, the frequency of the signal applied to the CPU power supply 3 should be regulated to 500 KHz. Now, the IBMC 104 outputs high level signals to the FETs Q1 and Q2. The FETs Q1 and Q2 are turned on. The power control chip 30 gains the resistance of the resistors R1, R2, and R3 connected in parallel through the detecting pin FS and regulates the frequency of the signal applied to the CPU power supply 3 to 500 KHz according to the resistance. When the power rating of the CPU 4 is 95 W, the frequency of the signal applied to the CPU power supply 3 should be regulated to 400 KHz. Now, the IBMC 104 outputs a high level signal to the FET Q1 and outputs a low level signal to the FET Q2. The FET Q1 is turned on, and the FET Q2 is turned off. The power control chip 30 gains the resistance of the resistors R1 and R2 connected in parallel through the detecting pin FS and regulates the frequency of the signal applied to the CPU power supply 3 to 400 KHz according to the resistance. When the power rating of the CPU 4 is 65 W, the frequency of the signal applied to the CPU power supply 3 should be regulated to 300 KHz. Now, the IBMC 104 outputs low level signals to the FET Q1 and Q2. The FETs Q1 and Q2 are turned off. The power control chip 30 gains the resistance of the resistor R2 through the detecting pin FS and regulates the frequency of the signal applied to the CPU power supply 3 to 300 KHz according to the resistance. Therefore, the frequency of the signal applied to the CPU power supply 3 can always be regulated according to the power rating of the CPU 4.

The power matching system 1 can control the CPU power supply 3 to regulate the frequency of the signal applied to the CPU power supply 3 corresponding to different power ratings through the control unit 10 and the control circuit 20. Therefore, the power matching system 1 improves the efficient use of the CPU power supply 3.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A power matching system applicable to a central processing unit (CPU) power supply, which includes a power control chip to regulate the frequency of the signal applied to the CPU power supply, wherein the power control chip comprising a detecting pin, the power matching system comprising:
   a control unit comprising:
      a platform controller hub (PCH) to obtain information concerning a CPU and store the information;
      a basic input output system (BIOS) to read the information from the PCH and establish the power rating of the CPU and output this data;
      an integrated baseboard management controller (IBMC) receives the data from the BIOS and outputs a control signal; and
   a control circuit to receive the control signal from the IBMC and output a required signal to the detecting pin of the power control chip, wherein the power control chip regulates the frequency of the signal applied to the CPU power supply according to the received required signal.

2. The power matching system of claim 1, wherein the control circuit comprises at least one electronic switch, and first and second resistors, a first terminal of the at least one electronic switch is connected to the IBMC, to receive the control signal, a second terminal of the at least one electronic switch is grounded, a third terminal of the at least one electronic switch is connected to the detecting pin of the power control chip through the first resistor, the second resistor is connected between the detecting pin of the power control chip and ground, when the IBMC outputs a high level signal, the at least one electronic switch is turned on.

3. The power matching system of claim 2, wherein the at least one electronic switch is a n-channel field effect transistor (FET), the first, second, and third terminals of the at least one electronic switch are a gate, a source, and a drain of the FET respectively.

4. The power matching system of claim 2, wherein the at least one electronic switch is a pnp transistor, the first, second, and third terminals of the at least one electronic switch are a base, an emitter, and a collector of the transistor respectively.

5. The power matching system of claim 1, wherein the required signal is a resistance obtained by the detecting pin of the power control chip.

* * * * *